3,799,852
METHOD OF REDUCING THE ORGANO-LEAD
CONTENT OF AQUEOUS SOLUTIONS BY
ELECTROLYSIS IN A POROUS CATHODE
ELECTROLYTIC CELL
Joseph E. Milam and Edward E. Estep, New Martinsville, W. Va., assignors to PPG Industries, Inc., Pittsburgh, Pa.
Filed Dec. 19, 1972, Ser. No. 316,597
Int. Cl. C02b *1/82;* C23b *5/16*
U.S. Cl. 204—149       10 Claims

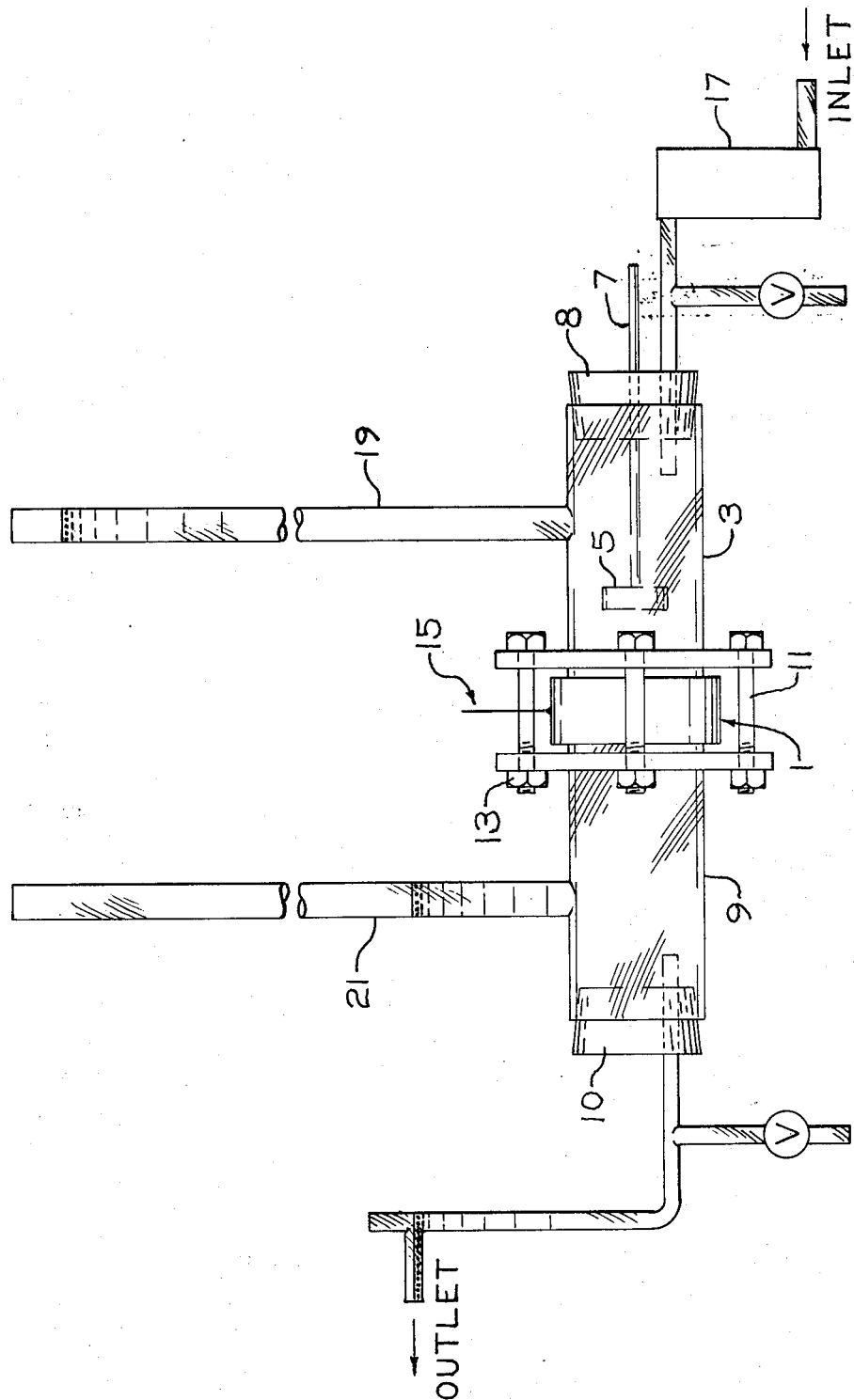

ABSTRACT OF THE DISCLOSURE

A method and apparatus are disclosed for reducing the organo-lead content of dilute aqueous solutions. The lead, present as organo-lead compounds, e.g., from the manufacture of automotive anti-knock additive, is in the form of compounds of the type $PbR_{4-n}X_n$ where R is an alkyl group having from 1 to 3 carbon atoms, X is a halogen, and $n$ is a number from 0 to 2. Most commonly, R is a methyl or ethyl group, $n$ is 1, and X is chlorine.

As disclosed herein, the solution containing the organo-lead compound is passed through an electrolytic cell having a porous, electrolyte-permeable graphite cathode.

BACKGROUND OF THE INVENTION

In the production of alkyl lead compounds, especially tetraethyl lead automotive anti-knock compound, a sodium-lead alloy and ethyl chloride are reacted in an autoclave. The autoclave product contains solids, liquids, and gases. Included therein are sodium chloride, ethane, ethyl chloride, various other chlorinated hydrocarbons, alkyl leads, alkyl lead complexes, and the like. The autoclave product is fed to a steam still for separation. In the steam still, considerable quantities of water and steam are added to the feed, and the gases are separated from the liquids and solids. While the solid fraction yields tetraethyllead and other anti-knock compounds, the liquid and gaseous fractions are also rich in lead compounds, such as triethyllead chloride.

In the various stages of the automotive anti-knock compound production process, the reactants, intermediates, and products are contacted with large quantities of water. This water, containing small amounts of organo-lead compounds, as well as the by-products from the steam still, presents a serious lead disposal and control problem. In the past it has been the practice to store these lead and organo-lead containing streams in a clarifier tank or settling lagoon, controlling and manipulating the pH of the lead solutions, and adding precipitants and sequestrants and allowing the lead content to settle out. Typically, the effluent from the clarifier tank and from the settling lagoon contain in excess of about 20 parts per million of lead.

Attempts to electrolytically remove the organo-lead compounds from the various aqueous streams in the tetraethyllead production process have generally resulted in the formation of tetraalkyl lead compounds which have a water solubility in excess of 2000 parts per million of lead. See, e.g., U.S. Pat. 3,696,009 to Mayerle et al. for Electro Synthesis of Tetra Organo-Lead Compounds. Other attempts at electrolysis of trialkyllead halide solutions has resulted in the dimerization and trimerization of the organo-lead compounds. Most attempts at removing these trace quantities of water-soluble organo-lead compounds by the use of complexing agents, sequestrants and pH control, while practical, have not been able to reduce the lead content below about 15 to 20 parts per million.

SUMMARY OF THE INVENTION

It has now surprisingly been found that when aqueous solutions of water-soluble organo-lead compounds and dispersions of insoluble lead compounds are electrolyzed in an electrolytic cell having a porous carbon or graphite cathode, dimerization and trimerization do not occur and very low lead levels are obtained in the effluent.

According to this invention, an aqueous solution of organo-lead compounds containing less than 2000 parts per million of lead, generally less than 100 parts per million of organo-lead compound and, most frequently, from about 1 to about 20 parts per million of the organo-lead compounds are fed to an electrolytic cell having a porous graphite cathode. The solution is electrolyzed in the cell at a cell voltage of from about 3 to about 7 volts, a current density of from about 10 to about 100 amperes per square foot based on cathode face area normal to the flow of the solution, and a residence time of the solution within the porous cathode of from about 0.05 minute to about 5.0 minutes, whereby in excess of about 95 percent of the lead is removed.

Additionally, when a small amount of hypochlorite ion is present in the electrolyte, the volumetric efficiency of the electrolytic cell is increased.

Hypochlorite ion may be introduced into the electrolyte in the form of chloride ion, which is subsequently converted to hypochlorite ion.

According to this invention, it is possible to recover an effluent from the cell having a lead content of 1 part per million or less, for example, as low as even 0.01 part per million of lead.

During electrolysis, the pressure drop across the cell shows an increase with time. After extended periods of electrolytic lead removal, the rate of pressure drop increase with time suddenly increases. Prior to or at this time, the cathode may be either replaced, or regenerated, e.g., by removal of the deposited lead containing materials therein.

DETAILED DESCRIPTION OF THE INVENTION

Accordingly to this invention, trace quantities of organo-lead compounds are removed from aqueous solution.

The water-soluble organo-lead compounds normally produced in the production of lead alkyl automotive anti-knock compounds have the formula $PbR_{4-n}X_n$ where R is an alkyl having from 1 to 3 carbon atoms, $n$ is a number from 0 to 2, and X is a halogen. Most commonly, R is the methyl group, —$CH_3$, or the ethyl group, —$C_2H_5$. Generally, $n$ is 1 or 2, and most commonly, $n$ is 2. Generally, X is chlorine or bromine and most commonly chlorine. The most common water-soluble organo-lead compounds, produced as by-products of the lead alkyl automotive anti-knock compound production process are triethyllead chloride, $Pb(C_2H_5)_3Cl$ and trimethyllead chloride,

$Pb(CH_3)_3Cl$

While these organo-lead compounds may have low solubilities, e.g., less than about two tenths of one percent, they are soluble, and they are most frequently present in trace quantities. For example, after buffering and the addition of sequestrants and precipitants the overflow from a clarifier pond or lagoon typically contains a measurable quantity of these compounds, e.g., less than about 140 parts per million of the alkyl lead chloride compounds, and most frequently from about 1 to about 20 parts per million of these compounds. Additionally, the overflow from clarifier ponds and settling lagoons contains about 20 grams per liter of chloride, about 13 grams per liter of sodium, and small amounts of aluminum and chromium, e.g., about the 10 to 15 parts per million.

According to this invention, the organo-lead compounds may be removed from aqueous solution by electrolysis of the solution in an electrolytic cell having a porous carbon or graphite cathode. According to a preferred exemplification of this invention, electrolysis is conducted at a cell voltage of from about 3 to about 7 volts, and most frequently, from about 5.6 to about 6.7 volts. The current density is from about 10 to about 100 amperes per square foot based upon cathode face area measured normal to the direction of flow. The residence time of the electrolyte within the porous carbon or graphite cathode is from about 0.05 to about 5.0 minutes. "Residence time" as the term is used herein, is the quotient of the void volume of the cathode divided by the volumetric flow rate to the cathode, in consistent units, giving a residence time in units of time. The void volume is the volume of the cathode multiplied by the porosity. For example, the void volume of a cylinder is given by the formula $\pi R^2 H E$ where $\pi R^2$ is the end area, H is the length of the cylinder, and E is the porosity of the cylinder. Thus, a cylindrical porous graphite cathode having a 2 inch face diameter, a 1.5 inch length, and a porosity of .48 has a void given by $\pi(1.00)^2(1.5)(0.48)$ i.e., about 2.25 cubic inches.

It has been found, according to this invention, that reduction of the lead content from a feed of about 10 to 15 parts per million of the organo-lead compounds down an effluent of to about 1 part per million of lead requires a residence time of from about 0.05 minute to about 5 minutes. At residence times of less than about 0.05 minute, while some lead removal occurs, the amount of lead removed is low and is a strong function residence time. In a porous graphite cathode where the pores have not been blocked by deposition of the lead compounds and where there is exposed graphite within the pores, most of the lead removal will occur in the first 0.5 minute of residence time or less. By about 0.5 minute, the lead content has been reduced by about 90 percent. Residence times of greater than about 0.5 minute, e.g., up to about 5 minutes, provide lead removal of greater than about 99 percent, for example, reducing the lead content of a feed containing from about 10 to about 15 parts per million of lead down to an effluent containing less than 0.1 part per million of lead.

Residence time may be varied by varying the void volume, defined above, and the flow rate. Flow rates, independent of cell geometry, are given in units of volume of feed per unit of cathode area per unit time where the unit of cathode area is measured perpendicular to the direction of flow. Thus, a 1.5 inch thick porous graphite cathode having a porosity of about 0.48 provides a residence time of about 0.1 minute at a volumetric flow rate of 4.0 gallons of electrolyte per square foot of cathode area normal to the direction of flow per minute. Preferably used are flow rates of from about 1 to about 2 gallons of electrolyte per square foot of cathode area per minute in a 1.5 inch thick graphite cathode having a porosity of 0.48, thereby providing a residence time of from about 0.2 to about 0.3 minute. For a cell having a porous graphite cathode with a thickness of 1.5 inch and a porosity of 0.48, a particularly satisfactory volumetric flow rate is 1.25 gallons of electrolyte per square foot of cathode area normal to the direction of flow per minute, providing a residence time of from about 0.3 to about 0.4 minute.

The process as described herein is particularly satisfactory at a current density of from about 10 to about 100 amps per square foot. Current density as defined herein is the current from the anode or anodes to the cathode divided by the cathode area normal to the direction of electrolyte flow. The cathode area normal to the direction of electrolyte flow, in the case of a cylindrical graphite electrode is $\pi \times R^2$ where R is the radius. Particularly good results are found to be obtained when the current density is in the range of from about 20 to about 80 amperes per square foot, at a cell voltage of from about 3.0 to about 7.0 volts. Particularly preferred is a cathode current density of from about 40 to about 50 amperes per square foot, at a cell voltage of from about 5.6 to about 6.7 volts.

The presence of hypochlorite ion in the electrolyte flowing through the cathode appears to provide particularly good lead removal. The presence of hypochlorite ion in the feed allows either the same degree of lead removal to be obtained with a decrease in residence time within the cathode, thereby allowing the same amount of cathode volume to be used for more electrolyte or, an increased amount of lead removal to be effected at the same residence time. For example, at a residence time of 1.48 minutes, with a feed containing 14 parts per million of triethyllead chloride, the effluent contained 0.35 parts per million of lead when the anode was downstream of the porous cathode. When the anode was upstream of the cathode allowing chloride ion to be electrolyzed at the anode to form hypochlorite ion the lead content in the effluent was 0.10 part per million of lead. At the same residence time with anodes both upstream and downstream of the cathode, the lead content in the effluent was 0.08 part per million.

In another experiment conducted at a residence time of 0.74 minute, a single anode downstream of the cathode resulted in a lead content in the effluent of about 0.70 part per million of lead. At the same residence time, but with anodes both upstream and downstream of the porous graphite cathode the lead content in the effluent was about 0.15 part per million.

Hypochlorite ion may be caused to be present in the solution during its passage through the porous graphite cathode in a number of ways. According to one exemplification, sodium hypochlorite may be added to the solution which may then be agitated, for example, for about 1 hour or more, to provide the ion.

According to another exemplification, an anode may be positioned upstream of the porous graphite cathode, producing hypochlorite ion. Some of the hypochlorite ion formed at the anode then passes to the cathode. The anode positioned upstream of the porous graphite cathode may be an auxiliary or second anode, serving primarily to provide hypochlorite ion. Alternatively, the anode upstream of the cathode may be the anode providing a significant portion of the electrolyzing current to the cell.

According to one exemplification of this invention, the solution to be purified by passage through the porous graphite cathode is pretreated with hydrochloric acid to maintain the pH of the solution at a level between 2 and 11, and preferably about 4.0.

It has been found that small particulates may block the pores of the electrode interfering with the removal of the lead, accordingly, a filter to remove particulate matter may be installed upstream of the cathode. For example, particularly satisfactory results are obtained with a filter having a pore size of 1 micron.

In the electrolytic removal of lead according to this invention, it has been observed that the pressure drop across the cell shows an increase with time. This increase with time is believed to be associated with the accumulation of lead species within the pores of the porous graphite electrode. The pressure increase with time appears to be of two types occurring in two successive stages. The first stage is characterized by a period of a gradual increase of pressure with time. The second stage is characterized by the sudden onset of a rapid increase of pressure with time. Thus, for example, when the logarithm of either time, or of cumulative current, is plotted against the logarithm of the pressure drop across the cell, two distinct curves are obtained. The first segment of the log-log plot is a flat, approximately linear curve. This is followed by a discontinuity in the slope of the curve and a sharply discontinuing curve of greater slope.

It has been found that if regeneration of the porous cathode occurs prior to the sharp increase in the slope of the log-log plot, the cathode can be regenerated easily, and at relatively low cost, as will be described herein-after. If, however, regeneration is delayed until after the discontinuity, regeneration is possible, but requires more time, necessitating greater down time, lost production, and higher costs.

The exact time at which the cathode should be regenerated or replaced is a matter which may be determined by routine experimentation and optimization with respect to lead removal, and cost factors.

The porous graphite cathode may be regenerated by circulating various acids through the cathode. Typically, dilute mineral acids such as hydrochloric acid may serve to remove the electrodeposited lead species from the pores of the cathode. The hydrochloric acid may be circulated at room temperature or at an elevated temperature, for example, from about 0° C. to about 100° C. Typically, the concentration of hydrochloric acid is from about 0.1 normal to about 1.0 normal.

During the regeneration process, the flow of electrical current to the cell may be cut off so that the porous graphite cathode functions primarily as a porous mass. Alternatively, the direction of flow of electrical current to the cell may be reversed so that the porous graphite electrode functions as an anode, allowing further removal of the electrodeposited lead species.

A cell particularly satisfactory for use in the practice of this invention is shown in FIG. 1. As shown in the figure, a porous graphite electrode 1 is held between an inlet flange 3 and an outlet flange 9. The flanges are held together by tie rods 11. Nuts 13 hold the tie rods in tension against the flanged edges of the flanged elbows 3 and 9, thereby holding the porous graphite electrode 1 in compression therebetween. Inside the inlet flange 3 is an electrode 5. Standlegs 19 and 21 provide a hydraulic head across the cell. Rubber stoppers 8 and 10 seal the ends of flange 7 and 9. During operation, the electrode 5 functions as the anode. Thus, in the preferred mode of operation, the solution to be purified enters through the inlet, passing through the filter 17 then by the anode 5 to the porous graphite cathode 1. The solution, reduced in lead content to about 1 part per million, then leaves the cell through the outlet flanged elbow 9.

The porous carbon useful in providing the cathode for the method of this invention generally should have a porosity of from about 0.40 to about 0.55, and an average pore diameter of from about 0.0010 inch to about 0.0060 inch, an air permeability of from about 0.5 to 20 cubic feet of air (volume measured at 70 degrees Fahrenheit and 760 millimeters of mercury absolute) at 70 degrees Fahrenheit, 15 percent relative humidity, and a two inch head of water, per minute per square foot of carbon through a one inch thickness of porous carbon, and a water permeability of from about 10 to about 90 gallons per square foot per minute through a one inch thick porous carbon plate at 70 degrees Fahrenheit and 5 pounds per square inch differential pressure. Such porous carbon electrodes generally are capable of retaining particles having a minimum particle diameter of from about 0.00035 inch to about 0.00350 inch.

A desirable cathode material is porous graphite having a porosity of from about 0.45 to about 0.50, an average pore diameter of from 0.0013 to about 0.0027 inch, and an average water permeability of from about 14.0 to about 45.0 gallons of water per square foot of graphite area per minute through a one-inch thick graphite plate at 70 degrees Fahrenheit and 5 pounds per square inch pressure.

A particularly desirable cathode may be provided by Union Carbide National Carbon Grade 45 Porous Graphite, having an average porosity of about 0.48, an average pore diameter of about 0.0023 inch, and a water permeability of 30 gallons per square foot per minute at 70 degrees Fahrenheit and 5 pounds per square inch pressure. Cathodes prepared from Grade 45 porous graphite are capable of retaining deposited and precipitated lead bearing particles having an average particle size greater than about 0.0009 inch.

EXAMPLE I

A solution was prepared containing approximately 15 parts per million of lead as triethyllead chloride. This solution was electrolyzed in an electrolytic cell having a porous graphite cathode wherein the lead content was reduced to approximately 80 parts per billion.

The solution was prepared by dissolving 1.81 grams of Alpha Inorganic Triethyllead chloride and 2,270 grams of chemically pure sodium chloride crystals in 75 liters of distilled water. The resulting solution contained 14.3 parts per million lead as triethyllead chloride, 18.5 grams per liter of chlorine as sodium chloride, and had a pH of 7.0.

The solution prepared above was then fed to an electrolytic cell. The electrolytic cell had a 2½ inch diameter (2 inch diameter active face) by 1.5 inch thick cathode. The cathode was fabricated from National Carbon Grade 45 Porous Graphite having a weight of 66 pounds per cubic foot, a 48 percent porosity, an average pore diameter of 0.0019 inch, and an average water permeability of 30 gallons per square foot per minute at 70° Fahrenheit and 5 pounds per square inch gauge pressure through a 1 inch thick plate. At each end of the graphite cathode was a 2 inch inside diameter by 5 inch "Pyrex" (trademark) flange to which a ¾ inch piece of 20 millimeter "Pyrex" (trademark) tubing had been sealed at a right angle. Each of the pipe flanges were bolted securely against the graphite cathode substantially as shown in FIG. 1. Stand legs were attached to each of the vertical 20 millimeter tubes in order to indicate the pressure drop across the graphite cathode. Each of the "Pyrex" (trademark) pipe flanges were sealed at the end opposite the cathode by a rubber stopper. A solution inlet pipe projected through the rubber stopper of one pipe flange and a solution outlet pipe projected through the other pipe flange. The anode lead-in penetrated the rubber stopper on the downstream flange. The anode was a block of impervious carbon, 1 inch by 1 inch by 0.375 inch attached to a carbon rod 0.32 inch in diameter. The carbon rod extended through the downstream rubber stopper and served for mechanical support of the anode and electrical conductivity to the anode.

Feed to the cell was by a positive displacement pump. The feed of the triethyllead chloride solution to the cell was started at a flow rate of 19 milliliters per minute (0.23 gallon per square foot of cathode area per minute) providing a residence time of 1.94 minutes. The voltage was 5.2 volts at 0.6 amp providing a cathode current density of 27.6 amps per square foot. After the cell had attained equilibrium, the average lead concentration in the effluent from the cell was approximately 0.084 to 0.086 part per million.

EXAMPLE II

The solution prepared in Example I was fed to a porous graphite cathode electrolytic cell of the type described in Example I except that the cathode was internally plated with palladium. The flow rate of 18.5 milliliters per minute (0.224 gallon per foot squared per minute) corresponded to a residence time of 1.99 minutes. The cell voltage was between 4.9 and 5.1 volts, and the current was 0.6 amp, providing a cathode current density of 27.6 amperes per square foot. After the cell had equilibrated, the lead concentration in the effluent was approximately 0.046 part per million.

EXAMPLE III

A solution containing approximately 4.9 parts per million of lead as triethyllead chloride was fed to a porous graphite cathode electrolyte cell of the type described in Example I.

The solution which contained 4.9 parts per million of lead as triethyllead chloride, was turbid in appearance and contained a considerable amount of particulate matter. The overflow also contained approximately 18 grams per liter of chloride ion as sodium chloride, at a pH of 7.3.

This solution was fed to an electrolytic cell of the type described in Example I having a porous graphite cathode. The flow rate was 10.7 milliliters per minute (0.130 gallon per square foot per minute) providing a residence time of 3.26 minutes. Electrolysis was conducted at a cell voltage of 6.5 volts and 0.66 amp providing a cathode current density of 30.3 amperes per square foot. After the cell had become equilibrated, the lead concentration in the effluent was between 0.2 and 0.25 part per million of lead.

EXAMPLE IV

The solution described in Example III was filtered through a 1 micron filter to remove the solid matter prior to entry into a cell of the type described in Example I above. The material actually fed through the filter to the cell contained 4.0 parts per million of lead as triethyllead chloride. The flow rate was 4.7 milliliters per minute (0.057 gallon per square foot per minute) providing a resident time of 7.83 minutes. The cell voltage was 6.5 volts and the current to the cell was 0.66 amp providing a current density of 30.3 amperes per square foot of cathode face area. After the cell had equilibrated, the effluent contained 0.04 to 0.044 part per million of lead.

EXAMPLE V

The filtered solution described in Example IV above, was filtered, and adjusted to a pH of 4 by the addition of hydrochloric acid. The resulting material, containing 4.0 parts per million of lead as triethyllead chloride was then fed to an electrolytic cell of the type described in Example I having a porous graphite cathode. The flow rate was 12.2 milliliters per minute (0.148 gallon per square foot per minute) providing a residence time of 3.0 minutes. The cell voltage was 5.6 volts and the current was 1.1 amps providing a cathode current density of 50.5 amperes per square foot. After the cell had equilibrated, the concentration of lead in the effluent was approximately 0.038 part per million.

EXAMPLE VI

The solution described in Example I was electrolyzed in an electrolytic cell of the type described in Example I having a porous graphite cathode. The anode of the cell was upstream of the cathode.

The solution was fed to the cell at the rate of 0.44 gallon per minute per square foot of cathode area. Electrolysis was conducted at 6.6 volts and a cathode current density of 45.8 amperes per square foot. The effluent contained 1.8 parts per million of lead.

EXAMPLE VII

A solution of clarifier pond overflow containing approximately 10.0 parts per million of lead as triethyllead chloride was fed to the cell described in Example I, having an anode downstream of the cathode. The cell voltage was 6.4 volts, the current density was 45.9 amperes per square foot. The flow rate was 0.21 gallon per minute per square foot providing a residence time of 1.48 minutes. The cell effluent contained from about 0.35 to about 0.40 part per million of lead.

EXAMPLE VIII

Example VII was repeated except that the anode was positioned upstream of the cathode. The cell effluent contained 0.10 part per million of lead.

EXAMPLE IX

Example VII was repeated except that anodes were both upstream and downstream of the cathode. The resulting cell effluent contained 0.08 part per million of lead.

EXAMPLE X

Clarifier pond overflow of the type described in Example VII was fed to an electrolytic cell of the type described in Example I containing an anode downstream of the porous graphite cathode. The flow rate was 0.42 gallon per minute per square foot providing a residence time of 0.74 minute. The cell voltage was 6.4 volts and the current density was 45.9 amperes per square foot of cathode area measured in the direction normal to the flow of solution. After the cell had equilibrated, the cell effluent contained 0.70 part per million of lead.

EXAMPLE XI

Example X was repeated except that the cell had two anodes, one upstream of the cathode and one downstream of the cathode. After the cell had equilibrated, the cell effluent contained 0.15 part per million of lead.

EXAMPLE XII

A cell was constructed as previously described, in Example I, having a porous graphite cathode. The anode was a 1.875 inch disc of platinum-iridium plated titanium. The cell was fed with a solution containing 2.8 parts per million of lead. The flow rate of 25 mls./min. corresponded to 0.30 gal./min./ft.$^2$. The cell current was 1.1 amps. corresponding to 45.9 amps./ft.$^2$; the cell voltage was 4.0–4.9 volts. The cell effluent contained 1.1 p.p.m. of lead.

Although the present invention has been described with reference to specific details of particular embodiments thereof, it is not intended thereby to limit the scope of the invention except insofar as specific details are recited in the appended claims.

We claim:

1. A process for removing organo-lead compounds from an aqueous solution comprising:
   feeding an aqueous solution containing chloride ion and from about 1 to about 200 parts per million lead, elemental basis, as an organo-lead compound chosen from the group consisting of dimethyl lead dichloride, diethyl lead dichloride, trimethyl lead chloride, and triethyl lead chloride, to an electrolytic cell having an anode and a porous carbon cathode;
   passing the solution past the anode whereby to generate hypochlorite ion in the solution prior to its passage through the cathode;
   thereafter passing the solution through the porous carbon cathode while imposing an electromotive force sufficient to provide a cathode current density of from about 10 to about 100 amperes per square foot of cathode face normal to the flow of solution across the cell, whereby lead is caused to be deposited within the cathode; and
   withdrawing a solution containing less than one part per million of lead, elemental basis.

2. The process of claim 1 wherein the porous carbon cathode is a porous graphite cathode.

3. The process of claim 1 wherein the organo-metallic compound is triethyllead chloride.

4. The process of claim 1 wherein the aqueous solution fed to the cell contains from about 1 to about 200 parts per million of lead.

5. The process of claim 1 wherein the residence time of the solution in the cathode is from about 0.05 minute to about 5 minutes.

6. The process of claim 1 wherein after a period of electrolysis, the flow of electricity and of organo-lead compound containing solution to said cell is halted and hydrochloric acid is fed to said cell to recover the lead in more concentrated form.

7. The process of claim 6 wherein the polarity of said cell is reversed.

8. A process for removing organo-lead compounds from an aqueous solution containing chloride ion from about 100 to about 200 parts per million of triethyl lead chloride comprising:

feeding the solution to an electrolytic cell having a porous graphite cathode, and an anode upstream of said cathode relative to the flow of said solution;

passing the solution past the anode whereby to generate hypochlorite ion in the solution prior to its passage through the cathode;

passing the solution through the porous cathode with a residence time of from about 0.05 to about 5 minutes in said cathode while imposing an electromotive force across the cell sufficient to provide to cathode current density of from about 10 to about 100 amperes per square foot of cathode face normal to the flow of solution whereby lead is caused to be deposited within the cathode; and withdrawing a solution containing less than one part per million of lead from said cell.

9. The process of claim 8 wherein after a period of electrolysis the flow of electricity and of organo-lead containing solution to said cell is halted and hydrochloric acid is fed to said cell to recover lead in a more concentrated form.

10. The process of claim 9 wherein the polarity of said cell is reversed.

References Cited
UNITED STATES PATENTS

| | | | |
|---|---|---|---|
| 3,457,152 | 7/1969 | Maloney et al. | 204—131 |
| 3,586,627 | 6/1971 | Gooch | 204—149 X |
| 3,616,356 | 10/1971 | Roy | 204—152 |
| 3,696,009 | 10/1972 | Mayerle et al. | 204—72 |

FREDERICK C. EDMUNDSON, Primary Examiner

U.S. Cl. X.R.

204—115